United States Patent
Sohn et al.

(10) Patent No.: US 11,482,039 B2
(45) Date of Patent: Oct. 25, 2022

(54) ANTI-SPOOFING METHOD AND APPARATUS FOR BIOMETRIC RECOGNITION

(71) Applicant: LG Electronics Inc., Seoul (KR)

(72) Inventors: Young Ho Sohn, Seoul (KR); Young Yeon Seo, Seoul (KR); Chang Jun Yeo, Seoul (KR); Jin Seok Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 16/743,456

(22) Filed: Jan. 15, 2020

(65) Prior Publication Data
US 2021/0133424 A1     May 6, 2021

(30) Foreign Application Priority Data
Oct. 31, 2019 (KR) .................. 10-2019-0138054

(51) Int. Cl.
| | |
|---|---|
| *G06V 40/12* | (2022.01) |
| *G06F 21/32* | (2013.01) |
| *G06Q 20/40* | (2012.01) |
| *G06K 9/62* | (2022.01) |
| *G06N 3/08* | (2006.01) |
| *H04M 1/72463* | (2021.01) |
| *G06V 40/40* | (2022.01) |

(52) U.S. Cl.
CPC .......... *G06V 40/1388* (2022.01); *G06F 21/32* (2013.01); *G06K 9/6256* (2013.01); *G06N 3/08* (2013.01); *G06Q 20/40145* (2013.01); *G06V 40/40* (2022.01); *H04M 1/72463* (2021.01)

(58) Field of Classification Search
CPC .......... G06K 9/00114; G06K 9/00899; G06K 9/6256; G06K 9/00087; G06K 9/6259; G06F 21/32; G06F 21/45; G06N 3/08; G06N 3/0454; G06N 20/00; G06Q 20/40145; G06Q 40/00; H04M 1/72463
See application file for complete search history.

(56) References Cited

U.S. PATENT DOCUMENTS

| | | | |
|---|---|---|---|
| 9,923,930 B2* | 3/2018 | Zhang | G06Q 20/32 |
| 10,580,243 B2* | 3/2020 | Harding | G07C 9/37 |
| 2010/0162386 A1* | 6/2010 | Li | G06F 21/32 726/19 |
| 2014/0109200 A1* | 4/2014 | Tootill | H04W 12/068 726/5 |
| 2017/0303129 A1* | 10/2017 | Boettcher | H04W 12/06 |
| 2018/0107885 A1* | 4/2018 | Jo | G06K 9/00013 |
| 2018/0309792 A1* | 10/2018 | Obaidi | G06F 21/32 |
| 2020/0089979 A1* | 3/2020 | Garcia Rodriguez | G06Q 20/40 |
| 2020/0184055 A1* | 6/2020 | Storm | G06F 21/32 |
| 2021/0110018 A1* | 4/2021 | Rowe | G06F 21/32 |

\* cited by examiner

*Primary Examiner* — John B Strege
(74) *Attorney, Agent, or Firm* — Fish & Richardson P.C.

(57) ABSTRACT

A method for biometrics spoofing detection according to an embodiment of the present disclosure includes receiving a biometric authentication request from an application, acquiring biometrics at a sensor, and applying a machine learning-based anti-spoofing scheme to the biometrics based on an authentication purpose of the biometrics. The anti-spoofing scheme for biometrics of the present disclosure may include a deep neural network generated by machine learning, and may be used in an Internet of Things environment using a 5G network.

19 Claims, 7 Drawing Sheets

|  | 1st Frame | 2nd Frame | 3rd Frame |
|---|---|---|---|
| Scheme A: | Trained Model No.1 | Trained Model No.1 | Trained Model No.2 (optional) |
| Scheme B: | Trained Model No.1 | Trained Model No.2 | Trained Model No.3 |
| Scheme C: | Trained Model No.1 | Trained Model No.2 | Trained Model No.1 (optional) |

ANTI-SPOOFING METHOD AND APPARATUS FOR BIOMETRIC RECOGNITION

CROSS-REFERENCE TO RELATED APPLICATION

Pursuant to 35 U.S.C. § 119(a), this application claims the benefit of earlier filing date and right of priority to Korean Patent Application No. 10-2019-0138054, filed on Oct. 31, 2019, the contents of which are hereby incorporated by reference herein in its entirety.

BACKGROUND

1. Technical Field

The present disclosure relates to an anti-spoofing technique for biometrics.

2. Description of Related Art

Biometrics relate to biological features that are unique to each individual, and are thus suitable for identity verification. Therefore, as a method for identity verification in various types of devices, biometrics such as fingerprints, irises, veins of palms or fingers, and faces are being used.

However, since biometrics are unchangeable, when biometric information is leaked, damage resulting therefrom will continuously arise.

Many users use a function of locking a screen of a device in order to suppress access to the device by a third party, and use biometric authentication as a method for unlocking the screen. Various financial services also require biometric authentication to perform financial procedures.

Accordingly, when a third party accesses a device or requests a service using forged biometrics, an anti-spoofing technique is necessary.

SUMMARY OF THE INVENTION

An aspect of the present disclosure is to provide an anti-spoofing scheme for biometrics that is suitable for each of various purposes of biometric authentication.

Another aspect of the present disclosure is to provide an anti-spoofing scheme for biometrics that provides user convenience and security confidentiality suitable for each of the various purposes of biometric authentication.

Still another aspect object of the present disclosure is to provide a method and an apparatus for improving a speed of anti-spoofing of biometrics while maintaining security confidentiality.

An embodiment of the present disclosure may provide an anti-spoofing scheme for biometrics that is suitable for an authentication purpose, by applying a different machine learning-based anti-spoofing scheme for biometrics based on the authentication purpose of the biometrics.

Another embodiment of the present disclosure may provide an anti-spoofing scheme for biometrics that provides user convenience and security confidentiality suitable for each purpose based on the authentication purpose of the biometrics.

According to another embodiment of the present disclosure, a speed of anti-spoofing of biometrics may be improved while maintaining security confidentiality.

An anti-spoofing method for biometrics according to an embodiment of the present disclosure includes acquiring biometrics by a sensor in response to a biometric authentication request received from an application, and applying a machine learning-based anti-spoofing scheme to the biometrics based on an authentication purpose.

Here, an anti-spoofing scheme in which at least one of a spoofing accept rate (SAR) or a false rejection rate (FRR) is different may be applied based on the authentication purpose.

Further, the anti-spoofing method for biometrics may further include applying an anti-spoofing scheme based on an application which requests authentication of biometrics.

Further, the anti-spoofing method for biometrics may further include applying a first anti-spoofing scheme to the biometrics in response to an authentication request to unlock a screen, and applying a second anti-spoofing scheme, which is different from the first anti-spoofing scheme, to the biometrics in response to an authentication request to perform a financial procedure.

An anti-spoofing apparatus for biometrics according to another embodiment of the present disclosure includes a processor, a sensor configured to acquire biometrics, and a memory configured to be electrically connected to the processor and store at least one code configured to be executed by the processor. The memory may store codes configured to cause the processor to acquire biometrics through the sensor and apply an anti-spoofing scheme to the biometrics based on an authentication purpose of the biometrics, and the anti-spoofing scheme may apply a machine learning-based trained model to the biometrics.

According to embodiments of the present disclosure, an anti-spoofing apparatus and method for biometrics may provide an anti-spoofing scheme for biometrics suitable for the purpose for authenticating the biometrics.

According to the embodiments of the present disclosure, an anti-spoofing scheme that provides user convenience and security confidentiality suitable for the purpose for authenticating the biometrics may be provided.

According to the embodiments of the present disclosure, a speed of anti-spoofing of biometrics may be improved while maintaining security confidentiality.

Further, according to the embodiments of the present disclosure, anti-spoofing of biometrics may be performed using a security DSP while maintaining security confidentiality.

The effects of the present disclosure are not limited to those mentioned above, and other effects not mentioned may be clearly understood by those skilled in the art from the following description.

BRIEF DESCRIPTION OF DRAWINGS

The above and other aspects, features, and advantages of the present disclosure will become apparent from the detailed description of the following aspects in conjunction with the accompanying drawings, in which.

DETAILED DESCRIPTION

Figure 1:
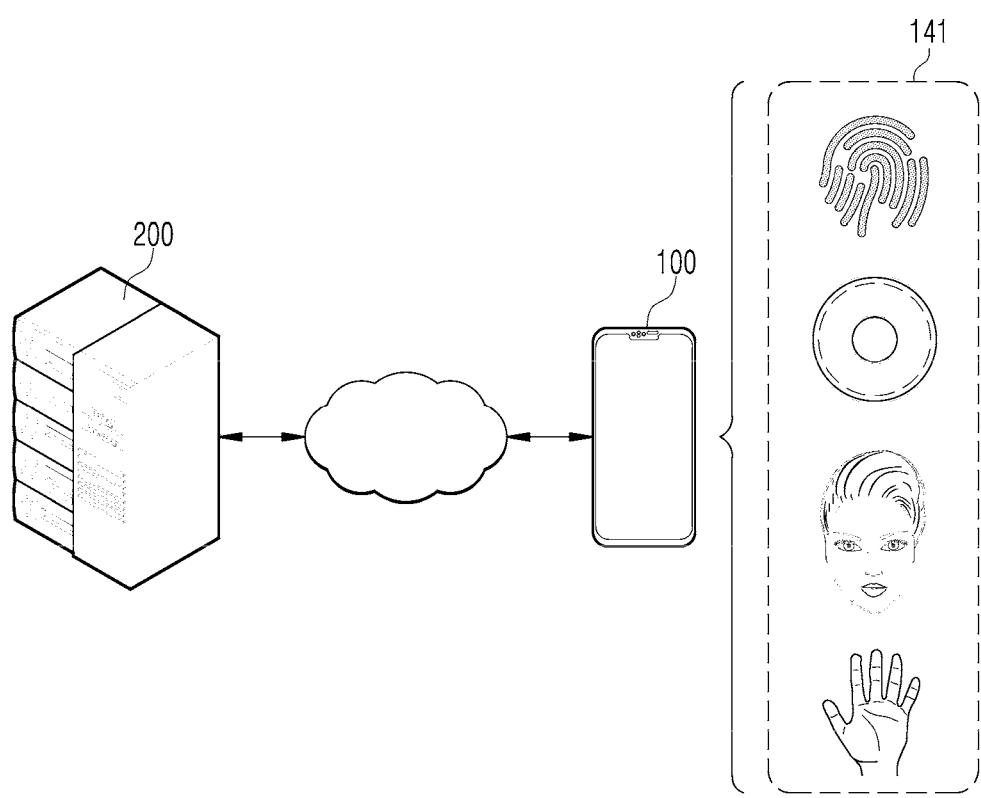
FIG. 1 is an exemplary diagram of an environment for performing an anti-spoofing method for biometrics according to an embodiment of the present disclosure.

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. In relation to describing the present disclosure, when the detailed description of the relevant known technology is determined to unnecessarily obscure the gist of the present disclosure, the detailed description may be omitted. Further, the accompanying drawings are provided for more understanding of the embodiment disclosed in the present specification, but the technical spirit disclosed in the present disclosure is not limited by the accompanying drawings. It should be understood that all changes, equivalents, and alternatives included in the spirit and the technical scope of the present disclosure are included.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed.

Specifically, machine learning may be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms "artificial neural network" and "neural network" may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

An ANN may be classified as a single-layer neural network or a multi-layer neural network, based on the number of layers therein.

A general single-layer neural network is composed of an input layer and an output layer.

In addition, a general multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms of an ANN may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be input to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an auto encoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One of semi-supervised learning techniques involves guessing the label of unlabeled training data, and then using this guessed label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

FIG. 1 is an exemplary diagram of an environment for performing an anti-spoofing method for biometrics according to an embodiment of the present disclosure.

The environment for performing an anti-spoofing method for biometrics according to an embodiment of the present disclosure may include a terminal 100, an artificial neural network learning device 200, and a network which allows the terminal and the artificial neural network learning device to communicate with each other.

The terminal 100 may support various kinds of object-to-object intelligent communication (such as Internet of things (IoT), Internet of everything (IoE), and Internet of small things (IoST)), and may support communication such as machine to machine (M2M) communication and device to device (D2D) communication.

The terminal 100 may perform anti-spoofing of biometrics using big data, an artificial intelligence (AI) algorithm, and/or a machine learning algorithm in a 5G environment connected for Internet of Things.

The terminal 100 may include a machine learning-based trained model trained by the learning device 200 to authenticate or verify the biometrics. The trained model may be a deep learning-based trained model including a neural network, which will be described below in detail.

The terminal 100 may request the user to provide biometrics in response to a request of the user to unlock the screen of the terminal 100 or use a service of an application installed in the terminal 100. The biometrics 141 may be a fingerprint, an iris, a face, or a vein of a palm or a finger of the user, but is not specifically limited.

The terminal 100 may apply an anti-spoofing scheme for biometrics including a trained model to biometrics acquired from a sensor. The terminal 100 may perform user authentication to confirm whether the acquired biometrics matches the stored biometrics before or after the anti-spoofing of the biometrics.

The anti-spoofing scheme for biometrics includes the entire process for deriving a final verification result, from the pre-processing of a trained model and the acquired biometrics. Therefore, when a neural network used for a trained model has a different structure, or when the neural network has the same structure but uses a different method for using an inference result of the trained model for the forgery of biometrics, the schemes may be considered as different schemes.

The terminal 100 may apply the anti-spoofing scheme for biometrics in a trusted execution environment (TEE). The trusted execution environment may also be referred to as Secure Enclave or Trusty.

The learning device 200 may transmit, to the terminal 100, a trained model to be used to authenticate biometrics or perform anti-spoofing of the biometrics in the terminal 100, or may store and provide the trained model in the terminal 100 in advance.

The learning device 200 may retrain the trained model to be used to authenticate the biometrics or perform anti-spoofing of the biometrics in the terminal 100, and transmit the retrained trained model or an anti-spoofing scheme for biometrics including the retrained trained model to the terminal 100. Alternatively, the learning device 100 may transmit, to the terminal 100, a scheme in which the same trained model is included but the method for finally determining whether the biometrics are forged using the inference result of the trained model is changed.

Figure 2:
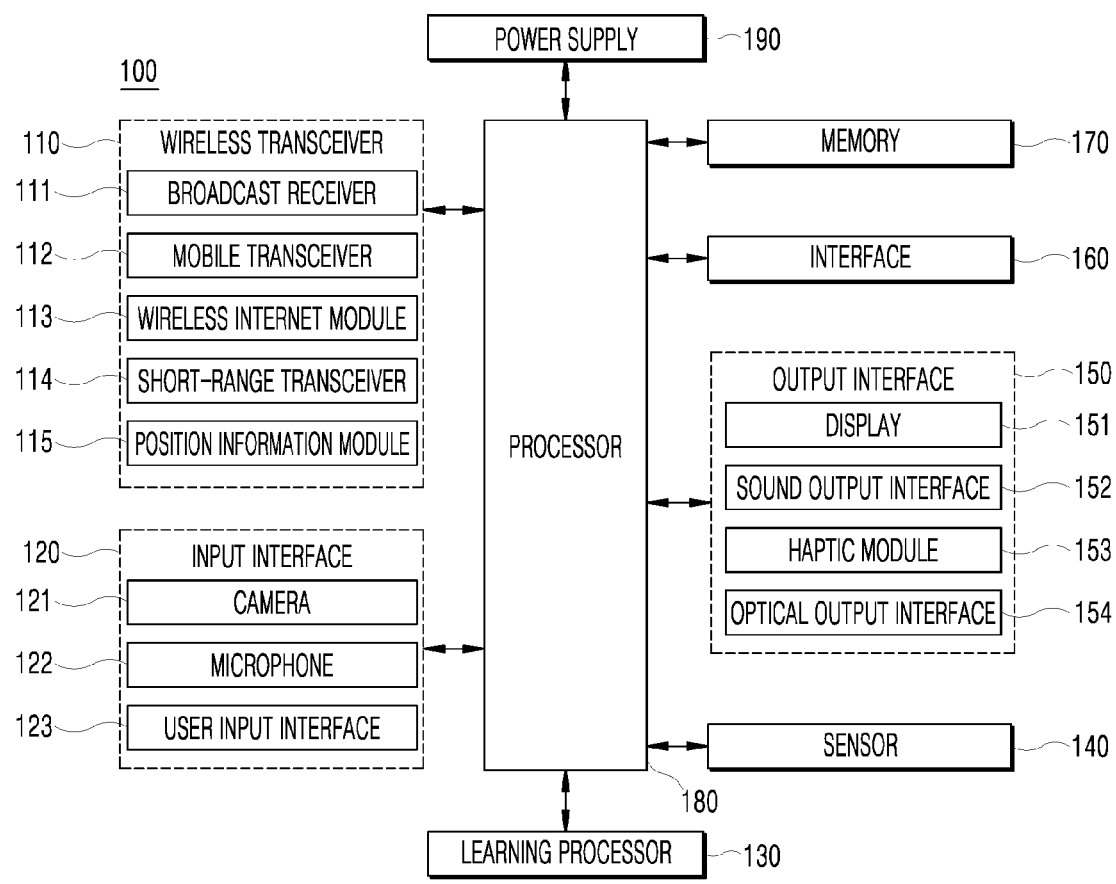
FIG. 2 is a block diagram illustrating a configuration of a terminal according to an embodiment of the present disclosure.

FIG. 2 is a block diagram illustrating the configuration of a terminal 100 according to an embodiment of the present disclosure.

The terminal 100 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, a digital signage.

Further, the terminal 100 may be implemented as various home appliances for household use, and may be also applied to a stationary or mobile robot.

The terminal 100 may perform a function of a voice agent. The voice agent may be a program which recognizes speech of the user and outputs, as speech, a response appropriate for the recognized speech of the user.

Referring to FIG. 2, the terminal 100 includes a wireless transceiver 110, an input interface 120, a learning processor 130, a sensor 140, an output interface 150, an interface 160, a memory 170, a processor 180, and a power supply 190.

A trained model may be loaded in the terminal 100.

The trained model may be implemented by hardware, software, or a combination of hardware and software. When a part or all of the trained model is implemented by software, one or more commands which configure the learning model may be stored in the memory 170.

The wireless transceiver 110 may include at least one of a broadcast receiver 111, a mobile transceiver 112, a wireless internet module 113, a short-range transceiver 114, or a position information module 115.

The broadcast receiver 111 receives a broadcasting signal and/or broadcasting related information from an external broadcasting management server through a broadcasting channel.

The mobile transceiver 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the terminal 100. The wireless Internet module 113 may be configured to transmit/receive a wireless signal in a communication network according to wireless internet technologies.

The wireless internet technologies may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range transceiver 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The position information module 115 is a module for obtaining the location (or the current location) of a mobile terminal, and its representative examples include a global positioning system (GPS) module or a Wi-Fi module. For example, the mobile terminal may obtain its position by using a signal transmitted from a GPS satellite through the GPS module.

The input interface 120 may include a camera 121 for inputting an image signal, a microphone 122 for receiving an audio signal, and a user input interface 123 for receiving information inputted by a user.

Speech data or image data collected by the input interface 120 may be analyzed to be processed as a control command of the user.

The input interface 120 may obtain training data for training a model and input data used to obtain an output using the trained model.

The input interface 120 may obtain unprocessed input data, and in this case, the processor 180 or the learning processor 130 may pre-processes the obtained data to generate training data to be inputted to the model learning or pre-processed input data.

Here, the preprocessing of input data may refer to extracting an input feature from the input data.

The input interface 120 is provided in order for image information (or signals), audio information (or signals), data, or information inputted by the user to be inputted, and in order to input the image information, the terminal 100 may include one or a plurality of cameras 121.

The camera 121 processes an image frame such as a still image or a moving image obtained by an image sensor in a video call mode or a photographing mode. The processed image frame may be displayed on the display 151 or stored in the memory 170.

The microphone 122 processes an external sound signal as electrical speech data. The processed speech data may be utilized in various forms in accordance with a function which is being performed by the terminal 100 (or an application program which is being executed). In the microphone 122, various noise removal algorithms which remove noise generated during the process of receiving the external sound signal may be implemented.

The user input interface 123 receives information from the user, and when the information is inputted through the user input interface 123, the processor 180 may control the operation of the terminal 100 so as to correspond to the inputed information.

The user input interface 123 may include a mechanical input interface (or a mechanical key, for example, a button located on a front, rear, or side surface of the terminal 100, a dome switch, a jog wheel, or a jog switch) and a touch type input interface. For example, the touch type input interface may be formed by a virtual key, a soft key, or a visual key which is disposed on the touch screen through a software process, or a touch key which is disposed on a portion other than the touch screen.

The learning processor 130 trains the model configured by an artificial neural network using the training data.

Specifically, the learning processor 130 allows the artificial neural network to repeatedly learn using various learning techniques described above to determine optimized model parameters of the artificial neural network.

In this specification, the artificial neural network which is trained using training data to determine parameters may be referred to as a learning model or a trained model.

In this case, the learning model may be used to deduce a result for the new input data, rather than the training data.

The learning processor 130 may be configured to receive, classify, store, and output information to be used for data mining, data analysis, intelligent decision making, and machine learning algorithm and techniques.

The learning processor 130 may include one or more memory units configured to store data which is received, detected, sensed, generated, previously defined, or output by another component, device, the terminal, or a device which communicates with the terminal.

The learning processor 130 may include a memory which is combined with or implemented in the terminal. In some exemplary embodiments, the learning processor 130 may be implemented using the storage 170.

Selectively or additionally, the learning processor 130 may be implemented using a memory related to the terminal, such as an external memory which is directly coupled to the terminal or a memory maintained in the server which communicates with the terminal.

According to another exemplary embodiment, the learning processor 130 may be implemented using a memory maintained in a cloud computing environment or other remote memory locations accessible by the terminal via a communication method such as a network.

The learning processor 130 may be configured to store data in one or more databases to identify, index, categorize, manipulate, store, search, and output data in order to be used for supervised or non-supervised learning, data mining, predictive analysis, or used in the other machine. Here, the database may be implemented using the memory 170, a memory 230 of the learning device 200, a memory maintained in a cloud computing environment or other remote memory locations accessible by the terminal via a communication method such as a network.

Information stored in the learning processor 130 may be used by the processor 180 or one or more controllers of the terminal using an arbitrary one of different types of data analysis algorithms and machine learning algorithms.

As an example of such an algorithm, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The processor 180 may determine or predict at least one executable operation of the terminal based on information which is determined or generated using the data analysis and the machine learning algorithm. To this end, the processor 180 may request, search, receive, or utilize the data of the learning processor 130 and control the terminal to execute a predicted operation or a desired operation among the at least one executable operation.

The processor 180 may perform various functions which implement intelligent emulation (that is, a knowledge based system, an inference system, and a knowledge acquisition system). This may be applied to various types of systems (for example, a fuzzy logic system) including an adaptive system, a machine learning system, and an artificial neural network.

The processor 180 may be configured as a plurality of cores and may be a system on chip (SoC) including a digital signal processor (DSP), a graphics processing unit (GPU), and an internal bus.

The processor 180 may include sub modules which enable operations involving voice and natural language voice processing, such as an I/O processing module, an environmental condition module, a speech to text (STT) processing module, a natural language processing module, a workflow processing module, and a service processing module.

The sub modules may have an access to one or more systems or data and a model, or a subset or a super set thoseof in the terminal. Further, each of the sub modules may provide various functions including a glossarial index, user data, a workflow model, a service model, and an automatic speech recognition (ASR) system.

According to another exemplary embodiment, another aspect of the processor 180 or the terminal may be implemented by the above-described sub module, a system, data, and a model.

In some exemplary embodiments, based on the data of the learning processor 130, the processor 180 may be configured to detect and sense requirements based on contextual conditions expressed by user input or natural language input or user's intention.

The processor 180 may actively derive and obtain information required to completely determine the requirement based on the contextual conditions or the user's intention. For example, the processor 180 may actively derive information required to determine the requirements, by analyzing past data including historical input and output, pattern matching, unambiguous words, and input intention.

The processor 180 may determine a task flow to execute a function responsive to the requirements based on the contextual condition or the user's intention.

The processor 180 may be configured to collect, sense, extract, detect and/or receive a signal or data which is used for data analysis and a machine learning task through one or more sensing components in the terminal, to collect information for processing and storing in the learning processor 130.

The information collection may include sensing information by a sensor, extracting of information stored in the memory 170, or receiving information from other equipment, an entity, or an external storage device through a transceiver.

The processor 180 collects usage history information from the terminal and stores the information in the memory 170.

The processor 180 may determine best matching to execute a specific function using stored usage history information and predictive modeling.

The processor 180 may receive or sense surrounding environment information or other information through the sensor 140.

The processor 180 may receive a broadcasting signal and/or broadcasting related information, a wireless signal, or wireless data through the wireless transceiver 110.

The processor 180 may receive image information (or a corresponding signal), audio information (or a corresponding signal), data, or user input information from the input interface 120.

The processor 180 may collect the information in real time, process or classify the information (for example, a knowledge graph, a command policy, a personalized database, or a conversation engine) and store the processed information in the memory 170 or the learning processor 130.

When the operation of the terminal is determined based on data analysis and a machine learning algorithm and technology, the processor 180 may control the components of the terminal to execute the determined operation. Further, the processor 180 may control the equipment in accordance with the control command to perform the determined operation.

When a specific operation is performed, the processor 180 analyzes history information indicating execution of the specific operation through the data analysis and the machine learning algorithm and technology, and updates the information which is previously learned based on the analyzed information.

Therefore, the processor 180 may improve precision of a future performance of the data analysis and the machine learning algorithm and technology based on the updated information, together with the learning processor 130.

The sensor 140 may include one or more sensors which sense at least one of information in the mobile terminal, surrounding environment information around the mobile terminal, and user information.

For example, the sensor 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, or a gas sensor), a chemical sensor (for example, an electronic nose, a healthcare sensor, or a biometric sensor), an iris sensor, and a time of flight (ToF) sensor. Further, the terminal 100 disclosed in the present disclosure may combine various kinds of information sensed by at least two of the above-mentioned sensors and may use the combined information.

The output interface 150 is for generating an output related to a visual, aural, or tactile stimulus and, may include at least one of a display 151, a sound output interface 152, a haptic module 153, and an optical output interface 154.

The display 151 displays (outputs) information processed in the terminal 100. For example, the display 151 may display execution screen information of an application program driven in the terminal 100 and user interface (UI) and graphic user interface (GUI) information in accordance with the execution screen information.

The display 151 may form a mutual layered structure with a touch sensor or be formed integrally to be implemented as a touch screen. The touch screen may simultaneously serve as a user input interface 123 which provides an input interface between the terminal 100 and the user and provide an output interface between the terminal 100 and the user.

The sound output interface 152 may output audio data received from the wireless transceiver 110 or stored in the memory 170 in a call signal reception mode, a phone-call mode, a recording mode, a speech recognition mode, or a broadcasting reception mode.

The sound output interface 152 may include at least one of a receiver, a speaker, or a buzzer.

The haptic module 153 may generate various tactile effects that can be felt by the user. A representative example of the tactile effect generated by the haptic module 153 may be vibration.

The optical output interface 154 outputs a signal for notifying occurrence of an event using light of a light source of the terminal 100. Examples of the event generated in the terminal 100 may be message reception, call signal reception, missed call, alarm, schedule notification, email reception, and information reception through an application.

The interface 160 serves as a passage with various types of external devices which are connected to the terminal 100. The interface 160 may include at least one of a wired/wireless headset port, an external charger port, a wired/wireless data port, a memory card port, a port which connects a device equipped with an identification module, an audio input/output (I/O) port, a video input/output (I/O) port, and an earphone port. The terminal 100 may perform appropriate control related to the connected external device in accordance with the connection of the external device to the interface 160.

The identification module is a chip in which various information for authenticating a usage right of the terminal 100 is stored, and may include a user identification module (UIM), a subscriber identify module (SIM), and a universal subscriber identity module (USIM). The device with an identification module (hereinafter, "identification device") may be manufactured as a smart card. Therefore, the identification device may be connected to the terminal 100 through the interface 160.

The memory 170 stores data which supports various functions of the terminal 100.

The memory 170 may store various application programs (or applications) driven in the terminal 100, data for the operation of the terminal 100, commands, and data (for example, at least one algorithm information for machine learning) for the operation of the learning processor 130.

The memory 170 may store the model which is learned in the learning processor 130 or the learning device 200.

If necessary, the memory 170 may store the trained model by dividing the model into a plurality of versions depending on a training timing or a training progress.

In this case, the memory 170 may store input data obtained from the input interface 120, learning data (or training data) used for model learning, a learning history of the model, and so forth.

In this case, the input data stored in the memory 170 may be not only data which is processed to be suitable for the model learning, but may also itself be unprocessed input data.

In addition to the operation related to the application program, the processor 180 may generally control overall operation of the terminal 100. The processor 180 may process a signal, data, or information which is inputted or outputted through the above-described components, or drive the application programs stored in the memory 170, so as to provide or process appropriate information or functions to the user.

Further, in order to drive the application program stored in the memory 170, the processor 180 may control at least some of components described with reference to FIG. 2. Moreover, the processor 180 may combine and operate at least two of components included in the terminal 100 to drive the application program.

As described above, the processor 180 may control an operation related to the application program and an overall operation of the terminal 100. For example, when the state of the terminal satisfies a predetermined condition, the processor 180 may execute or release a locking state which restricts an input of a control command of a user for the applications.

The power supply 190 receives application of external power or internal power, and supplies the power to the components included in the user equipment 100, under the control of the processor 180. The power supply 190 includes a battery, and the battery may be an embedded battery or a replaceable battery.

Figure 3:
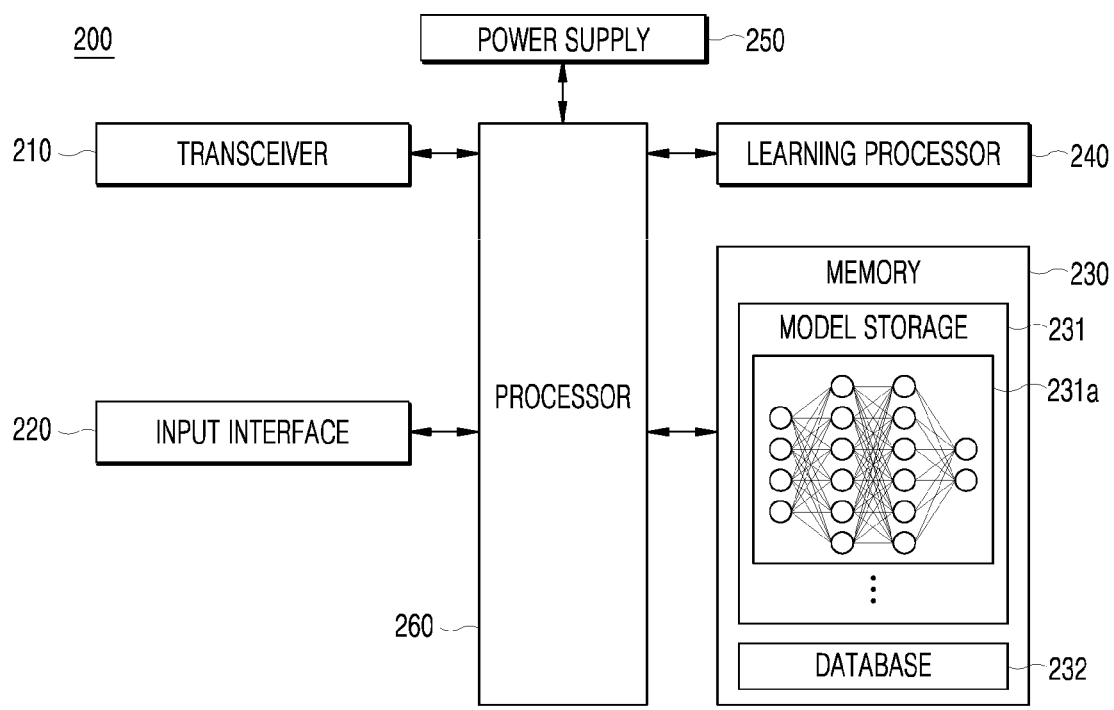
FIG. 3 is a block diagram illustrating a configuration of a learning device of an artificial neural network according to an embodiment of the present disclosure.

FIG. 3 is a block diagram illustrating a configuration of a learning device 200 of an artificial neural network according to an embodiment of the present disclosure.

The learning device 200 is a device or a server which is separately configured at the outside of the terminal 100, and may perform the same function as the learning processor 130 of the terminal 100.

That is, the learning device 200 may be configured to receive, classify, store, and output information to be used for data mining, data analysis, intelligent decision making, and machine learning algorithms. Here, the machine learning algorithm may include a deep learning algorithm.

The learning device 200 may communicate with at least one terminal 100, and derive a result by analyzing or learning the data on behalf of, or by assisting, the terminal 100. Here, the meaning of "assisting" another device may refer to distribution of computing power by means of distributed processing.

The learning device 200 of the artificial neural network may be various devices for training an artificial neural network, and normally refers to a server. The learning device 200 may also be referred to as a learning device or a learning server.

Specifically, the learning device 200 may be implemented not only by a single server, but also by a plurality of server sets, a cloud server, or a combination thereof.

That is, the learning device 200 may be configured as a plurality of learning devices to configure a learning device set (or a cloud server), and at least one learning device 200 included in the learning device set may derive a result by analyzing or learning the data through the distributed processing.

The learning device 200 may transmit a model trained by machine learning or deep learning to the terminal 100 periodically or upon request.

Referring to FIG. 3, the learning device 200 may include, for example, a transceiver 210, an input interface 220, a memory 230, a learning processor 240, a power supply 250, and a processor 260.

The transceiver 210 may correspond to a configuration including the wireless transceiver 110 and the interface 160 of FIG. 2. That is, the transceiver may transmit and receive data with the other device through wired/wireless communication or an interface.

The input interface 220 is a configuration corresponding to the input interface 120 of FIG. 2, and may obtain data by receiving the data through the transceiver 210.

The input interface 220 may obtain input data for acquiring an output using training data for model learning and a trained model.

The input interface 220 may obtain unprocessed input data, and in this case, the processor 260 may pre-process the obtained data to generate training data to be inputted to the model learning or pre-processed input data.

In this case, the pre-processing on the input data performed by the input interface 220 may refer to extracting of an input feature from the input data.

The memory 230 is a configuration corresponding to the memory 170 of FIG. 2.

The memory 230 may include a model storage 231, a database 232, and so forth.

The model storage 231 stores a model (or an artificial neural network 231a) that is being trained or has been trained through the learning processor 240, and when the model is updated through the training, stores the updated model.

If necessary, the model storage 231 stores the trained model by dividing the model into a plurality of versions depending on a training timing or a training progress.

The artificial neural network 231a illustrated in FIG. 3 is one example of an artificial neural network including a plurality of hidden layers, but the artificial neural network of the present disclosure is not limited thereto.

The artificial neural network 231a may be implemented by hardware, software, or a combination of hardware and software. When a part or all of the artificial neural network 231a is implemented by the software, one or more commands which configure the artificial neural network 231a may be stored in the memory 230.

The database 232 may store input data obtained from the input interface 220, learning data (or training data) used to train a model, a learning history of the model, and so forth.

The input data stored in the database 232 may be not only data which is processed to be suitable for the model learning, but may also itself be unprocessed input data.

The learning processor 240 is a configuration corresponding to the learning processor 130 of FIG. 2.

The learning processor 240 may train the artificial neural network 231a using training data or a training set.

The learning processor 240 may immediately obtain data which is obtained by pre-processing input data obtained by the processor 260 through the input interface 220 to train the artificial neural network 231a, or may obtain pre-processed input data stored in the database 232 to train the artificial neural network 231a.

Specifically, the learning processor 240 may repeatedly train the artificial neural network 231a using the various learning techniques described above so as to determine optimized model parameters of the artificial neural network 231a.

In this specification, the artificial neural network which is trained using training data to determine parameters may be referred to as a learning model or a trained model.

In this case, the trained model may be loaded in the learning device 200 to deduce a result value, or may be transmitted to another device such as the terminal 100 through the transceiver 210 to be loaded.

Further, when the trained model is updated, the updated trained model may be transmitted to another such as the terminal 100 via the transceiver 210 to be loaded.

The power supply 250 is a configuration corresponding to the power supply 190 of FIG. 2.

Redundant description of corresponding configurations will be omitted.

Figure 4:
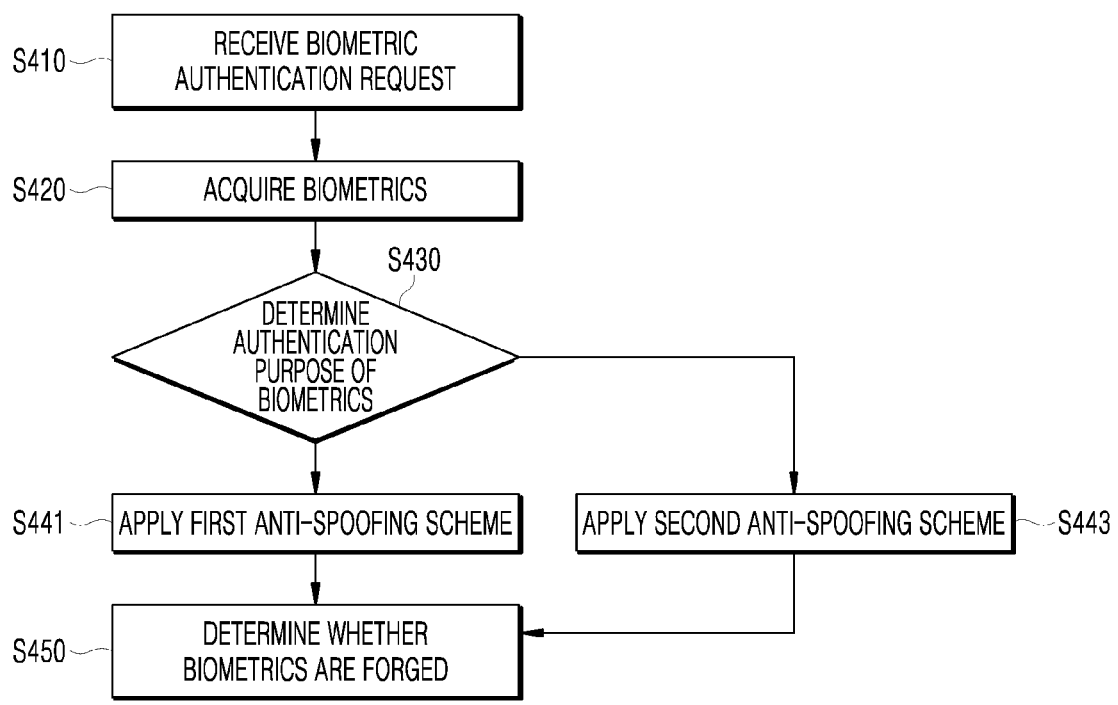
FIG. 4 is a flowchart for explaining an anti-spoofing method for biometrics according to an embodiment of the present disclosure.
Figure 5:
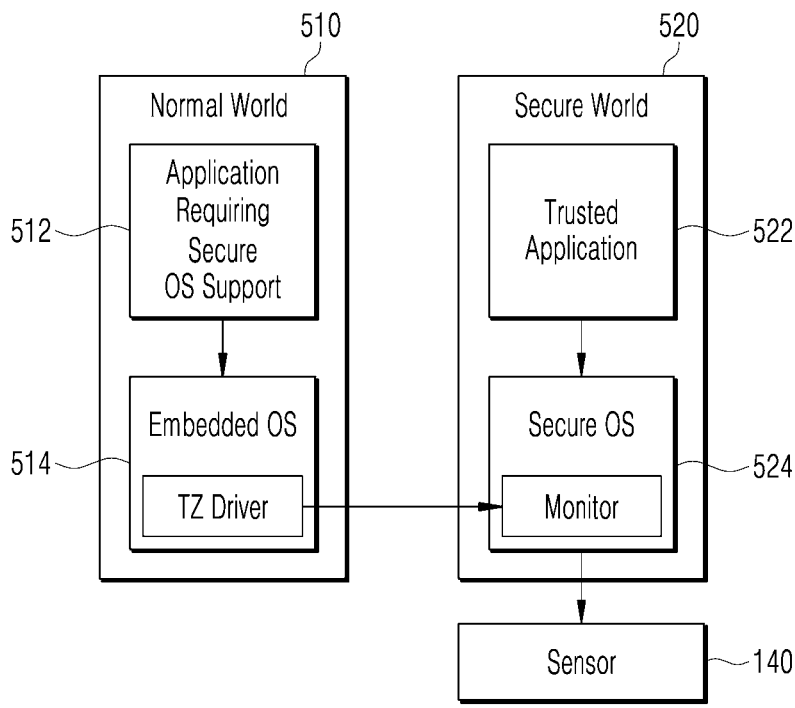
FIG. 5 is an exemplary diagram of a trusted execution environment for performing an anti-spoofing method for biometrics according to an embodiment of the present disclosure.
Figures 7, 8:
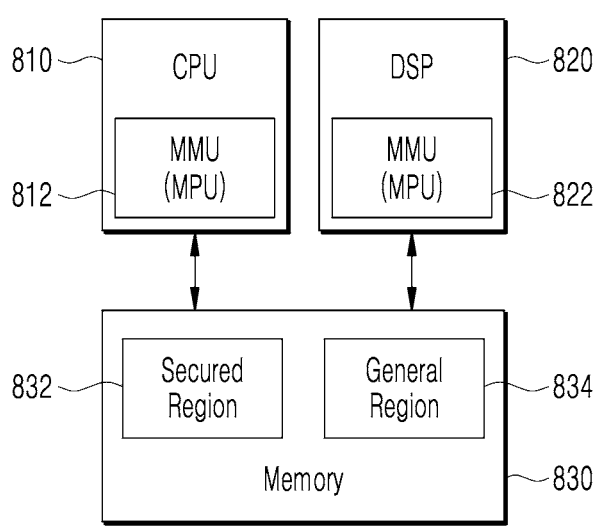
FIG. 7 is a view illustrating an anti-spoofing scheme for biometrics according to an embodiment of the present disclosure.
FIG. 8 is a schematic block diagram of a processor and a DSP for performing an anti-spoofing method for biometrics according to an embodiment of the present disclosure.

FIG. 4 is a flowchart for explaining an anti-spoofing method for biometrics according to an embodiment of the present disclosure. FIG. 5 is an exemplary diagram of a trusted execution environment for performing an anti-spoofing method for biometrics according to an embodiment of the present disclosure. FIG. 8 is a schematic block diagram of a processor and a DSP for performing an anti-spoofing method for biometrics according to an embodiment of the present disclosure.

In step S410, the terminal 100 may receive a biometric authentication request from a system application or a general application.

An application (client application (CA)) 512 which requests biometric authentication may be an application executed in a normal world 510 of a trusted execution environment (TEE, Secure Enclave, or Trusty). The CA 512 requests a biometric authentication application 522, which is a trusted application (TA) of a secure world 520, for the authentication of the biometrics using a system call of an operating system 514. The biometric authentication TA 522 may be executed in the secure world of the trusted execution environment, and the trusted execution environment may provide a series of safety services for TA.

In step S420, the biometric authentication TA 522 may acquire biometrics through the sensor 140 in response to the biometric authentication request.

The sensor 140 may be a fingerprint sensor, an iris sensor, a ToF sensor for face recognition, or a vision sensor for vein recognition. Hereinafter, a fingerprint sensor will be described as an example.

The fingerprint sensor may acquire the fingerprint of the user by an optical method, an electrostatic method, or an ultrasonic method.

In one embodiment, when the fingerprint sensor is implemented by an optical method, the fingerprint sensor may be disposed below a display element (not illustrated) of the display. Light emitted from the display element of the display or a separate light emitting diode disposed below the display element of the display is reflected onto a fingerprint area of the user, and then passes through a protective layer of the display to reach the fingerprint sensor below the display element of the display. The biometric authentication TA 522 acquires a fingerprint image of the user from the light which reaches the fingerprint sensor.

In another embodiment, when the fingerprint sensor is implemented by an electrostatic method or an ultrasonic method, in the specification, sensed fingerprint data is referred to as a fingerprint image, like the optical type fingerprint sensor.

The terminal 100 may extract fingerprint information by pre-processing a fingerprint image before authenticating the biometrics or performing anti-spoofing of the biometrics, and use the extracted fingerprint information to authenticate the biometrics or perform anti-spoofing of the biometrics.

For example, the terminal 100 pre-processes the fingerprint image to acquire a grayscale image for feature points of the fingerprint. The pre-processing of the fingerprint image may include image normalization, image segmentation for fingerprint valid region, fingerprint orientation map, fingerprint enhancement processing, fingerprint binarization, and fingerprint thinning.

After determining the authentication purpose of the biometrics in step S430, the terminal 100 may apply different anti-spoofing schemes for biometrics to the biometrics in accordance with the authentication purpose thereof.

The terminal 100 may determine the authentication purpose of the biometrics based on the application which requests the authentication of the biometrics.

In steps S441 and S443, the terminal 100 may apply an anti-spoofing scheme for biometrics to the feature points extracted from the pre-processed grayscale image from the fingerprint image, or apply a scheme including a CNN type learning model to the grayscale image as the anti-spoofing scheme for biometrics.

A trained model included in the scheme, which is a machine learning-based trained model, is trained using biometrics directly acquired from a human and forged biometrics as training data, and the training data is labelled with whether the biometrics directly acquired from a human and the forged biometrics are forged. Therefore, when the trained model is applied to the acquired biometrics, an inference value indicating whether the biometrics are forged may be outputted from the trained model.

The terminal 100 may apply different anti-spoofing schemes for biometrics in accordance with the application which requests the authentication of the biometrics.

In one embodiment, the biometric authentication application may include two parts, a CA and a TA, and a specific application may request the biometric authentication application CA in a normal world for the authentication of the biometrics or request the biometric authentication application TA in a secure world for the authentication of the biometrics. When the biometric authentication request is received by the biometric authentication application CA or the biometric authentication application TA, the terminal 100 may apply different anti-spoofing schemes for biometrics.

In another embodiment, the terminal 100 may apply different schemes for anti-spoofing biometrics based on an application ID of an application which requests the authentication of the biometrics. For example, after acquiring a unique application ID used to build a package of an application which requests the authentication of the biometrics, the terminal may apply different schemes for anti-spoofing biometrics having different security levels based on the acquired application ID. Alternatively, an application ID is acquired from registration information of the application registered in an application market server which distributes the application which requests the authentication of biometrics, and different schemes may be applied based on the acquired application ID.

In another embodiment, the terminal 100 may apply different schemes for anti-spoofing biometrics based on a security level registered in the terminal 100 of the application which requests the authentication of the biometrics.

The schemes for anti-spoofing biometrics may have different structures of neural network included in the trained model of the scheme. For example, the number of hidden layers may be different or a structure of a convolution layer may be different, or a weighting parameter may be different. Alternatively, an activation function used for an active layer may be different.

In another embodiment, the schemes for anti-spoofing biometrics may have the same structure of neural network included in the trained model of the scheme, but may have different criteria for determining the inference result of the trained model.

For example, when a final layer of a neural network included in the trained model has two output values and a softmax function is applied to the output value of the final layer as an activation function, the final output of the neural network may be treated as confidence. A specific scheme may determine a node label having a high output value among the final outputs as an estimation label that indicates whether the biometrics are forged, or may have separate criteria for determining final output values within a predetermined range.

Figure 6:
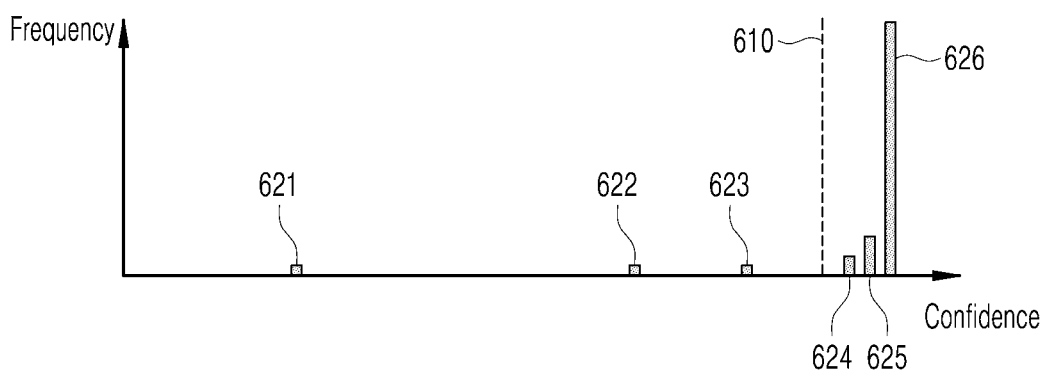
FIG. 6 is a view illustrating an anti-spoofing scheme for biometrics according to an embodiment of the present disclosure.

Referring to FIG. 6, the specific scheme may determine that in biometrics 624 to 626, which have a confidence equal to or higher than a predetermined value 610, a node label having a high output value among the final outputs is an estimation label indicating whether the biometrics are forged, and may determine that the biometrics 621 to 623 which have a confidence equal to or lower than the predetermined value 610 are all forged or are all not forged regardless of the node label. Further, the scheme may determine that biometrics which have confidence within a predetermined range are all forged or are all not forged regardless of the node label.

Therefore, for the majority of the biometrics having high confidence, the terminal 100 determines whether the biometrics are forged based on confidence, and for the minority of the biometrics having low confidence, the terminal 100 determines whether the biometrics are forged in accordance with a scheme policy. Accordingly, user convenience may be ensured by lowering a false rejection rate (FRR) while maintaining a constant level of spoofing accept rate (SAR).

The terminal 100 may apply different schemes, which use different combinations of trained models among a plurality of trained models, to biometrics to verify whether the biometrics are forged.

For example, whether a fingerprint image is forged may be verified based on a result of applying three trained models having different structures to the fingerprint image. Further, if a high security level is necessary in accordance with an authentication purpose, a scheme configured by trained models with complex structures but having a high level of SAR may be applied, and if not, a scheme configured by simple trained models but having a low FRR may be applied.

Referring to FIG. 7, the terminal 100 continuously acquires a plurality of frames of biometrics, and applies an anti-spoofing scheme for biometrics based on the result of applying the trained model to each frame. In this case, the scheme for anti-spoofing the biometrics may apply trained models having different structures to at least two frames among a plurality of biometric frames, respectively.

For example, if the inference results of applying the same trained model to two fingerprint images which are continuously acquired are different, a scheme A may determine whether the fingerprint image is forged by reflecting the inference result of selectively applying a different trained model to a third fingerprint image which is additionally acquired.

Alternatively, a scheme B may determine whether the fingerprint image is forged by reflecting an inference result of applying different trained models to three fingerprint images which are continuously acquired.

Alternatively, if the inference results of applying different trained models to two fingerprint images which are continuously acquired are different, a scheme C may determine whether the fingerprint image is forged by reflecting the inference result of selectively applying a different trained model to a third fingerprint image which is additionally acquired.

The terminal 100 may apply an anti-spoofing scheme for biometrics using a plurality of frames of biometrics in accordance with the authentication purpose, or apply an anti-spoofing scheme for biometrics using the plurality of frames in accordance with all authentication requests.

In step S450, the terminal 100 may determine whether the biometrics are forged based on a result of applying different schemes based on the authentication purpose. As described above, even if the scheme includes the same trained model, the determination criteria which reflect the inference result of the trained model may be different from each other. Further, in some schemes, a plurality of biometric frames may be used to determine whether the biometrics is forged.

In order to increase an execution speed of an operation performed when the trained model is applied to the biometrics, the terminal 100 may perform vector operation or matrix calculation of the trained model in a separate digital signal processor (DSP) or a graphics processing unit (GPU). The DSP or the GPU may be implemented as a system on chip (SoC) in the processor, or implemented as a separate chip.

When the DSP or the GPU performs an operation for applying the trained model, the DSP or the GPU may be a secured DSP or a secured GPU. Therefore, the processor in the normal world of the trusted execution environment cannot use the secured DSP or the secured GPU, and only the processor in the secure world may use the secured DSP or the secured GPU.

A method of performing the operation for applying a trained model in the secured DSP by the terminal 100 will be described below with reference to FIG. 8.

The operation for applying the trained model may be instructed to a secured DSP 820 by a CPU 810, and codes for the operation may be stored in a secured memory region 832 of a memory 830. The secured memory region 832 of the memory may be implemented to be physically or logically separate from a general region 834. The process of the CPU 810 may control the access to the secured memory region 832 of the memory 830 by a memory protection unit (MPU) or a memory management unit (MMU). The process of the CPU 810 performed in the trusted execution environment may share a page table with a secured DSP. Therefore, a memory transaction initiated by a process performed in the secure world of the trusted execution environment may access the secured memory region 832 associated with the secured DSP of the memory 830 by the control of the memory protection unit or the memory management unit, and codes (including data) for operations required to apply the trained model may thereby be stored. Therefore, the secured DSP associated with the secured memory region 832 of the memory 830 may access the secured memory region 832 of the memory 830 by the control of the memory protection unit or the memory management unit and thereby receive codes (including data) for operations required to apply the trained model, and may execute the codes. Therefore, the secured environment may be continuously maintained while performing anti-spoofing of the biometrics using the secured DSP.

Figure 9:
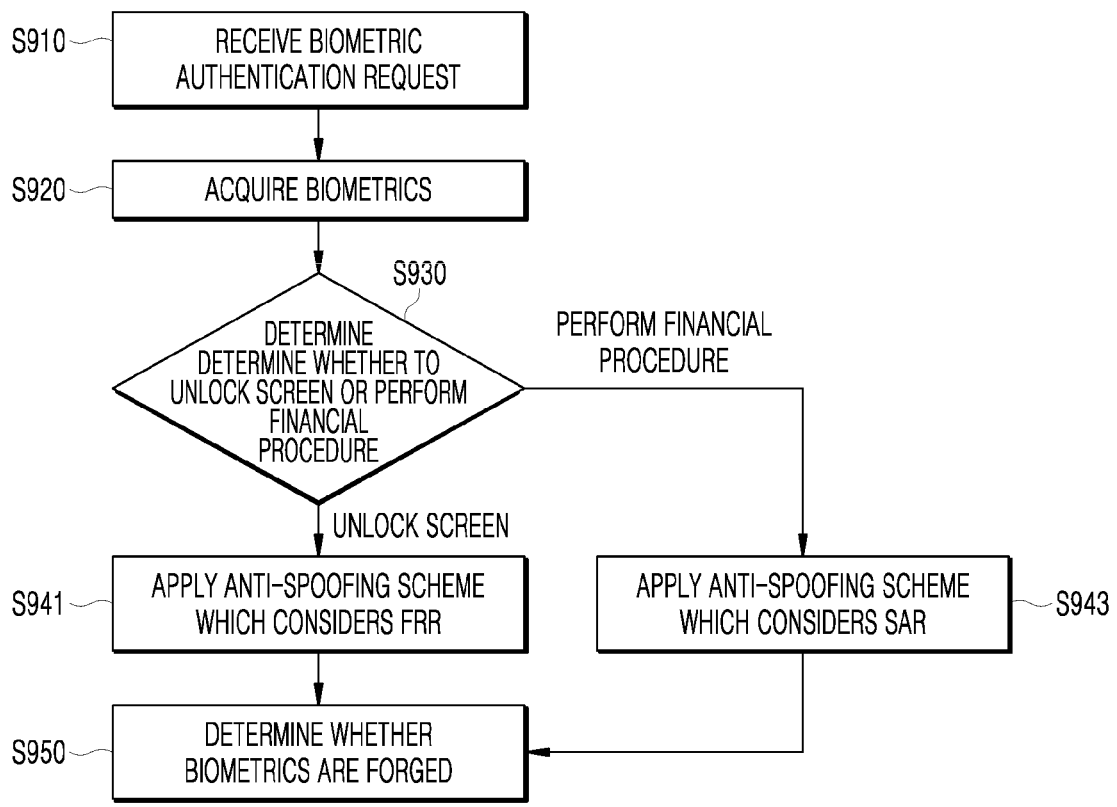
FIG. 9 is a flowchart for explaining an anti-spoofing method for biometrics according to an embodiment of the present disclosure.

FIG. 9 is a flowchart for explaining an anti-spoofing method for biometrics according to another embodiment of the present disclosure. Hereinbelow, description overlapping with that of FIGS. 1 to 8 will be omitted.

In response to a biometric authentication request received in step S910, the terminal 100 acquires biometrics of a user in step S920, and in step S930 determines whether the purpose of the biometric authentication request is to unlock the screen of the terminal 100 or to perform a financial procedure.

For example, whether the purpose of the biometric authentication request is to unlock the screen of the terminal 100 or to perform a financial procedure may be determined based on an application ID of an application which requests the biometric authentication or registration information of a market server which distributes the application.

When the purpose of the biometric authentication request is to unlock the screen, the terminal 100 may perform anti-spoofing of the biometrics by applying a scheme in which the FRR is considered, among a plurality of schemes, to the biometrics in order to improve user convenience. When the purpose of the biometric authentication request is to perform a financial procedure, the terminal 100 may perform anti-spoofing of the biometrics by applying a scheme in which the SAR is considered, among a plurality of schemes, to the biometrics in order to improve the security of the financial procedure.

For example, schemes including trained models having different structures may have different SARs and FRRs. Alternatively, even if the schemes include the same trained model, if the criteria for determining the forgery of the biometrics based on the inference result of the trained model are different, the SAR and the FRR of the schemes may be different from each other.

In step S950, the terminal 100 may determine whether the biometrics are forged by applying determination criteria in accordance with the policy of the scheme, based on the result of applying the trained model included in the scheme to the biometrics.

The present disclosure described above may be embodied as computer-readable codes on a medium on which a program is recorded. The computer readable medium includes all types of recording devices in which data readable by a computer system readable may be stored. Examples of the computer readable medium include a Hard Disk Drive (HDD), a Solid State Disk (SSD), a Silicon Disk Drive (SDD), a ROM, a RAM, a CD-ROM, a magnetic tape, a floppy disk, an optical data storage device, etc. Moreover, the computer may include a processor 180 of a terminal.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," "such as") used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations may be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

What is claimed is:

1. A method for biometrics spoofing detection, the method comprising:
   receiving a biometric authentication request from an application;
   acquiring biometrics at a sensor; and
   applying a machine learning-based anti-spoofing scheme to the biometrics based on an application ID used to build the application which requests the authentication of the biometrics or a registration information of the application in a server which distributes the application.

2. A method for biometrics spoofing detection, the method comprising:
   receiving a biometric authentication request from an application;
   acquiring biometrics at a sensor;
   applying a machine learning-based anti-spoofing scheme to the biometrics based on an authentication purpose of the biometrics, and
   applying a first anti-spoofing scheme to the biometrics in response to an authentication request to unlock a screen, or a second anti-spoofing scheme to the biometrics in response to an authentication request to perform a financial procedure,
   wherein the first anti-spoofing scheme and the second anti-spoofing scheme are different schemes.

3. The method according to claim 2, wherein the first anti-spoofing scheme and the second anti-spoofing scheme are different schemes in at least one of a spoofing accept rate (SAR) or a false rejection rate (FRR) is different.

4. The method according to claim 2, wherein the first anti-spoofing scheme and the second anti-spoofing scheme have different spoofing detection criteria for an output value of a machine learning-based trained model used for anti-spoofing.

5. The method according to claim 4, further comprising:
   applying an anti-spoofing scheme having a criterion that determines biometrics having the output value of the trained model applied to the biometrics which is within a predetermined range, in response to the authentication request to unlock the screen, as biometrics which are not spoofing, and
   wherein a false rejection rate (FRR) of the second anti-spoofing scheme is higher than an FRR of the first anti-spoofing scheme.

6. A method for biometrics spoofing detection, the method comprising:

receiving a biometric authentication request from an application;
acquiring biometrics at a sensor;
applying a machine learning-based anti-spoofing scheme to the biometrics based on an authentication purpose of the biometrics, and
applying an anti-spoofing scheme using at least one trained model among a plurality of machine learning-based trained models having different structures based on the authentication purpose of the biometrics.

7. The method according to claim 6, further comprising:
applying an anti-spoofing scheme using different combinations of the trained models based on the authentication purpose of the biometrics.

8. The method according to claim 7, further comprising:
acquiring a plurality of biometric frames from the sensor, wherein each biometric frame is acquired from the sensor at a different time, and
applying trained models having different structures to at least two frames among the plurality of biometric frames.

9. The method according to claim 1, wherein the anti-spoofing scheme for the biometrics is performed in a secure world of a trusted execution environment.

10. A non-transitory computer readable recording medium in which a computer program configured to cause a computer to execute the method according to claim 1 when the computer program is executed by the computer is stored.

11. An apparatus for biometrics spoofing detection, the apparatus comprising:
a processor;
a sensor configured to acquire biometrics; and
a memory configured to be electrically coupled with the processor and store at least one code configured to be executed by the processor,
wherein the memory stores codes configured to cause the processor to acquire biometrics through the sensor and apply a first anti-spoofing scheme to the biometrics for an authentication purpose of unlocking a screen or apply a second anti-spoofing scheme to the biometrics for an authentication purpose of performing a financial procedure in response to an authentication request,
wherein at least one of the first anti-spoofing scheme or the second anti-spoofing scheme applies a machine learning-based trained model to the biometrics, and
wherein the first anti-spoofing scheme and the second anti-spoofing scheme are different schemes.

12. The apparatus according to claim 11, further comprising a display including a transparent protective layer,
wherein the memory further stores codes configured to cause the sensor disposed below a display element of the display to acquire the biometrics from reflected light received through the protective layer.

13. The apparatus according to claim 11, wherein the trained model is trained using biometrics directly acquired from a human and forged biometrics as training data,
wherein the training data is labeled with whether the biometrics directly acquired from a human or the forged biometrics are forged.

14. The apparatus according to claim 11, wherein the memory further stores codes configured to cause the processor to apply at least one of the first anti-spoofing scheme or the second anti-spoofing scheme based on an application through a process of a secure world of a trusted execution environment, in response to a request of the application executed in a normal world of the trusted execution environment.

15. The apparatus according to claim 14, wherein the processor includes at least one of a graphics processing unit (GPU), a digital signal processor (DSP), or a dedicated machine learning processor disposed inside or outside the processor, and
the memory further stores codes configured to cause the processor to control an operation performed to apply the trained model to the biometrics, wherein the operation is performed by at least one of the GPU, the DSP, or the dedicated machine learning processor.

16. The apparatus according to claim 15, wherein the memory further stores codes configured to cause the processor to initiate a memory transaction for storing data required for the operation in a secured memory region associated with at least one of the GPU, the DSP, or the dedicated machine learning processor, and cause the memory transaction, which is permitted to access the secured memory region by a memory protection unit or a memory management unit, to store the data in the secured memory region.

17. The apparatus according to claim 16, wherein the memory further stores codes configured to cause the processor which performs the anti-spoofing scheme to share a page table with at least one of the GPU, the DSP, or the dedicated machine learning processor, and transmit data required for the operation to at least one of the GPU, the DSP, or the dedicated machine learning processor based on the secured memory region associated with the page table.

18. An apparatus for biometrics spoofing detection, the apparatus comprising:
a processor;
a sensor configured to acquire biometrics; and
a memory configured to be electrically coupled with the processor and store at least one code configured to be executed by the processor,
wherein the memory stores codes configured to cause the processor to acquire biometrics through the sensor and apply an anti-spoofing scheme to the biometrics using at least one trained model among a plurality of machine learning-based trained models having different structures based on an authentication purpose of the biometrics, wherein the anti-spoofing scheme applies a machine learning-based trained model to the biometrics.

19. An apparatus for biometrics spoofing detection, the apparatus comprising:
a processor;
a sensor configured to acquire biometrics; and
a memory configured to be electrically coupled with the processor and store at least one code configured to be executed by the processor,
wherein the memory stores codes configured to cause the processor to acquire biometrics through the sensor and apply a machine learning-based anti-spoofing scheme to the biometrics based on an application ID used to build the application which requests the authentication of the biometrics or a registration information of the application in a server which distributes the application.

* * * * *